US010757089B1

(12) United States Patent
Hohler et al.

(10) Patent No.: US 10,757,089 B1
(45) Date of Patent: Aug. 25, 2020

(54) MOBILE PHONE CLIENT APPLICATION AUTHENTICATION THROUGH MEDIA ACCESS GATEWAY (MAG)

(71) Applicant: Sprint Communications Company L.P., Overland Park, KS (US)

(72) Inventors: Ricky A. Hohler, Olathe, KS (US); Robin D. Katzer, Louisburg, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 327 days.

(21) Appl. No.: 15/912,521

(22) Filed: Mar. 5, 2018

(51) Int. Cl.
| | | |
|---|---|---|
| H04L 29/06 | (2006.01) | |
| H04L 9/32 | (2006.01) | |
| H04W 12/06 | (2009.01) | |
| H04W 12/08 | (2009.01) | |
| H04W 12/04 | (2009.01) | |
| H04W 80/04 | (2009.01) | |

(52) U.S. Cl.
CPC ........ *H04L 63/0807* (2013.01); *H04L 9/3213* (2013.01); *H04L 9/3234* (2013.01); *H04W 12/06* (2013.01); *H04W 12/08* (2013.01); *H04W 12/04* (2013.01); *H04W 80/04* (2013.01)

(58) Field of Classification Search
CPC . H04L 63/08; H04L 63/0807; H04L 63/0853; H04L 63/0876; H04L 9/32; H04L 9/3213; H04L 9/3234; H04W 12/08; H04W 12/06; H04W 12/04; H04W 80/04
See application file for complete search history.

(56) References Cited

U.S. PATENT DOCUMENTS

| | | | |
|---|---|---|---|
| 2010/0208706 A1* | 8/2010 | Hirano | H04W 60/005 370/332 |
| 2014/0282990 A1* | 9/2014 | Engelhart | H04L 63/08 726/9 |
| 2016/0344635 A1* | 11/2016 | Lee | H04L 47/20 |

(Continued)

OTHER PUBLICATIONS

Holder, Ricky A., et al., "Server Application Access Authentication Based on SIM", U.S. Appl. No. 16/162,028, filed Oct. 16, 2018.

(Continued)

*Primary Examiner* — Kristine L Kincaid
*Assistant Examiner* — Shaqueal D Wade (57) ABSTRACT

A mobile communication device. The device comprises a client application that checks a non-transitory memory of the device for a web application access token corresponding to the client application, determines that the non-transitory memory does not store the web application access token, transmits a web application access token request via a cellular radio transceiver of the device to a Media Access Gateway (MAG), where the web application access token request comprises an identification of an Internet Protocol (IP) address allocated to the device when authenticating into a radio access network (RAN) by the cellular radio transceiver, receives a web application access token from the MAG, stores the web application access token in the non-transitory memory, and sends a request to access a web application comprising the web application access token to a web application server, where the web application server is different from the MAG.

20 Claims, 8 Drawing Sheets

(56) References Cited

U.S. PATENT DOCUMENTS

2017/0048697 A1* 2/2017 Lundstrom ........... H04W 88/16
2017/0127276 A1* 5/2017 Koo ................... H04L 63/0807

OTHER PUBLICATIONS

Hohler, Ricky A., et al., "Secondary Device Authentication Proxied from Authenticated Primary Device)", U.S. Appl. No. 16/363,581, filed Mar. 25, 2019.
Holder, Ricky A., et al., "Server Application Access Authentication Based on SIM", U.S. Appl. No. 16/162,208, filed Oct. 16, 2018.

* cited by examiner

MOBILE PHONE CLIENT APPLICATION AUTHENTICATION THROUGH MEDIA ACCESS GATEWAY (MAG)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices have become wide spread in the United States and have expanded their services far beyond simple voice communications. Mobile communication devices have become relatively powerful computing platforms in their own right, and users execute a variety of applications on their mobile communication devices. These mobile applications can include games, navigation tools, social networking clients, special interest news, shopping applications, and others.

SUMMARY

In an embodiment, a method of authenticating a request from a client application on a mobile communication device to access a web application using independent verification of a wireless subscription service account is disclosed. The method comprises receiving a request from a mobile communication device to attach to a radio access network (RAN) and authenticating the mobile communication device into the RAN; allocating an Internet Protocol (IP) address for use by the mobile communication device. The method further comprises storing an association of the IP address allocated for use by the mobile communication device and wireless communication service account information associated with the mobile communication device and transmitting to the mobile communication device an identification of the IP address allocated for use by the mobile communication device. The method further comprises receiving a device request for a web application access token by a media access gateway (MAG) from the mobile communication device, wherein the device request comprises the Internet Protocol (IP) address allocated for use by the mobile communication device. The method further comprises looking up a wireless communication service account by the MAG based on the IP address received in the request for the web application access token, obtaining a mobile directory number (MDN) of the wireless communication service account by the MAG, and sending a MAG request for the web application access token by the MAG to a web application server, where the MAG request comprises the MDN obtained by the MAG. The method further comprises receiving the MAG request for the web application access token by the web application server and verifying the MDN by the web application server. The method further comprises creating a web application access token by the web application server, where the web application access token comprises the MDN and an identity of the mobile communication device associated with the wireless communication service account associated with the MDN, and transmitting the web application access token by the web application server to the MAG. The method further comprises transmitting the web application access token by the MAG to the mobile communication device. The method further comprises receiving a request to access a web application by the web application server from the mobile communication device, wherein the request to access the web application comprises the web application access token, validating the web application access token by the web application server, and performing a service by the web application server identified in the request to access the web application.

In another embodiment, a mobile communication device is disclosed. The mobile communication device comprises a processor, a non-transitory memory, a cellular radio transceiver, and a client application stored in the non-transitory memory. When executed by the processor, the client application checks the non-transitory memory for a web application access token corresponding to the client application, determines that the non-transitory memory does not store the web application access token, and transmits a web application access token request via the cellular radio transceiver to a Media Access Gateway (MAG), where the web application access token request comprises an identification of an Internet Protocol (IP) address allocated to the mobile communication device when authenticating into a radio access network (RAN) by the cellular radio transceiver. The client application further receives a web application access token from the MAG, stores the web application access token in the non-transitory memory, and sends a request to access a web application comprising the web application access token to a web application server, where the web application server is different from the MAG.

In yet another embodiment, a method of authenticating a request from a client application on a mobile communication device to access a web application using independent verification of a wireless subscription service account is disclosed. The method comprises receiving a device request for a web application access token by a media access gateway (MAG) from a mobile communication device, wherein the device request comprises an Internet Protocol (IP) address allocated for use by the mobile communication device, looking up a wireless communication service account by the MAG based on the IP address received in the request for the web application access token, obtaining a mobile directory number (MDN) of the wireless communication service account by the MAG, and sending a MAG request for the web application access token by the MAG to a web application server, where the MAG request comprises the MDN obtained by the MAG. The method further comprises receiving the MAG request for the web application access token by the web application server, where the web application server executes a web application, verifying by the web application server that the wireless communication service account associated with the MDN in the MAG request is in good standing and that the mobile communication device is provisioned for access to the web application, creating a web application access token by the web application server, where the web application access token comprises the MDN, an identity of the mobile communication device associated with the wireless communication service account associated with the MDN, and a time-to-live, and transmitting the web application access token by the web application server to the MAG. The method further comprises transmitting the web application access token by the MAG to the mobile communication device. The method further comprises receiving a request to access the web application by the web application server from the mobile communication device, wherein the request to access the web application comprises the web application access token and identifies a web application account, validating the web application access token by the web application server by assuring the MDN is associated with the web application account identified in the request to access the web application and that the time-to-live in the web application access token is not expired, and performing a service by the web application server identified in the request to access the web application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for mobile communication devices to access a web application securely. As mobile communication devices have become more powerful, becoming in fact mobile execution platforms, users increasingly use these mobile communication devices for conducting sensitive or confidential transactions. The transactions may be buying a new phone billed against a wireless communication service post-paid account. The transactions may be completing a banking wire transfer. The transactions may be conducted by a client application executing on the mobile communication device communicating with a server in the Internet. A challenge is conducting these transactions from a mobile communication device both conveniently and securely, for example reducing fraud and cybercrime.

Conventionally a first level of security is provided by a server application executing on a computer challenging a client application to provide a username and password. But sometimes users employ the same username and password on a plurality of accounts, for example the same username and password on a soccer fan social networking site and on a wireless communication service subscriber self-service account. When users get hacked on one system, cybercriminals often use the hacked credentials in an attempt to hack accounts the users have on other systems, for example their electronic banking account, their wireless communication service subscriber self-service account. It is desirable to avoid this kind of cyber threat, but how is this to be done while retaining convenience for users?

The present disclosure teaches a system and method of validating a client application based on an authentication of the mobile communication device into a radio access network (RAN) and then leveraging that RAN authentication for accessing a server application associated with the client application. Because it is generally considered that the RAN is not hackable, this provides a high level of security. The client application on the mobile communication device is configured to obtain a server application access token during initialization by requesting the token from a media access gateway (MAG). To do this, the mobile communication device must first have authenticated into the RAN. When the mobile communication device authenticates into the RAN, an internet protocol (IP) address is allocated to the device, and this IP address is stored as an entry in a data store indexed to other wireless communication service account information such as the mobile directory number (MDN) of the device. The IP address is returned to the mobile communication device. When the mobile communication device requests the server application access token, the MAG determines the IP address associated with the mobile communication device (e.g., parses a source IP address in the request message). It looks up the MDN of the device based on the IP address in the data store. The MAG then forwards the request for the server application access token along with the MDN to the server hosting the server application.

The server hosting the server application validates the request for the server application access token in various ways. It uses the MDN to look up wireless communication service account information related to the mobile communication device. It determines if the account is paid up, if the mobile communication device is provisioned to access the server application, and if the mobile communication device has been reported as lost or stolen. If any conditions or criteria are not met, the server application rejects the token request. If, however, all checks out good, the server application builds a server application access token that comprises information such as the MDN, a serial-type identification of the mobile communication device (e.g., a hardware identifier such as an international mobile equipment identity (IMEI)), and a subscriber identity. The token may comprise a time to live value for the token. The token may comprise a signature hash value computed over some of the contents of the token such as the MDN, IMEI, subscriber identity, and time to live.

The server returns the token to the MAG, and the MAG returns the token to the client application executing on the mobile communication device. The client application stores the server application access token in the mobile communication device. When the client application then desires to access a service of the server application, the client application sends a service request comprising the server application access token to the server.

The server first validates the token and only if the token validates does it pass the service request on to the server application. Part of the validation includes confirming that the service requested, for example a request to purchase a phone on a specific wireless communication service account, is consistent with the information in the token, for example agrees with the subscriber identity contained in the token. Depending on the requested service, the server application may challenge the client application to provide a username and password before performing the requested service.

It is noted that the system and method described herein is broadly effective against robot cyberattacks that seek to hack into a server application by trying, one after another, a large number of user identities and passwords. If the request for service from a hacker does not have a server application access token, it is dropped by the server before ever being examined by the server application. If the request for service from a hacker contains a token with an expired time to live (e.g., a token has been copied and is reused later), the request is rejected. If the request for service from a hacker includes a token that does not match the account referenced in the request, the request is rejected. The process described above for obtaining a token via a request to the MAG and validating the token in a service request at the server (e.g., by a device authentication server (DAS) application executing on the same server computer as the server application) before passing the service request on to the server application can increase the efficiency of operations in several ways. By dropping requests (e.g., by the DAS application) before sending to the server application, the processing of the server application can be performed more efficiently. By dropping requests before sending to the server application, hackers can be deterred from even attempting the hack, thereby avoiding the network being burdened by hacker attacks. Further, the process described above leverages the heightened security available from the RAN authentication process to obtain the token while further supporting unloading traffic from the RAN and running the traffic from the mobile communication device to the server application via a WiFi access point still with the heightened security. This solution avoids the potential risk of hackers obtaining user identities and associated passwords on a different site (e.g., a large social networking site) and systematically trying each of the hacked user identities and password pairs in the attempt to hack user accounts through the server application.

Once the client application has stored the server application access token, it can request services provided by the server application either through cellular communication links or through a WiFi link, by providing the token in the service request message. When the token time to live expires, when the client application sends a request for service with the token, the request is rejected with a message indicating the time to live of the token is expired or the token is no good. The client application then can go through the process described above for obtaining a fresh server application access token.

Figure 1:
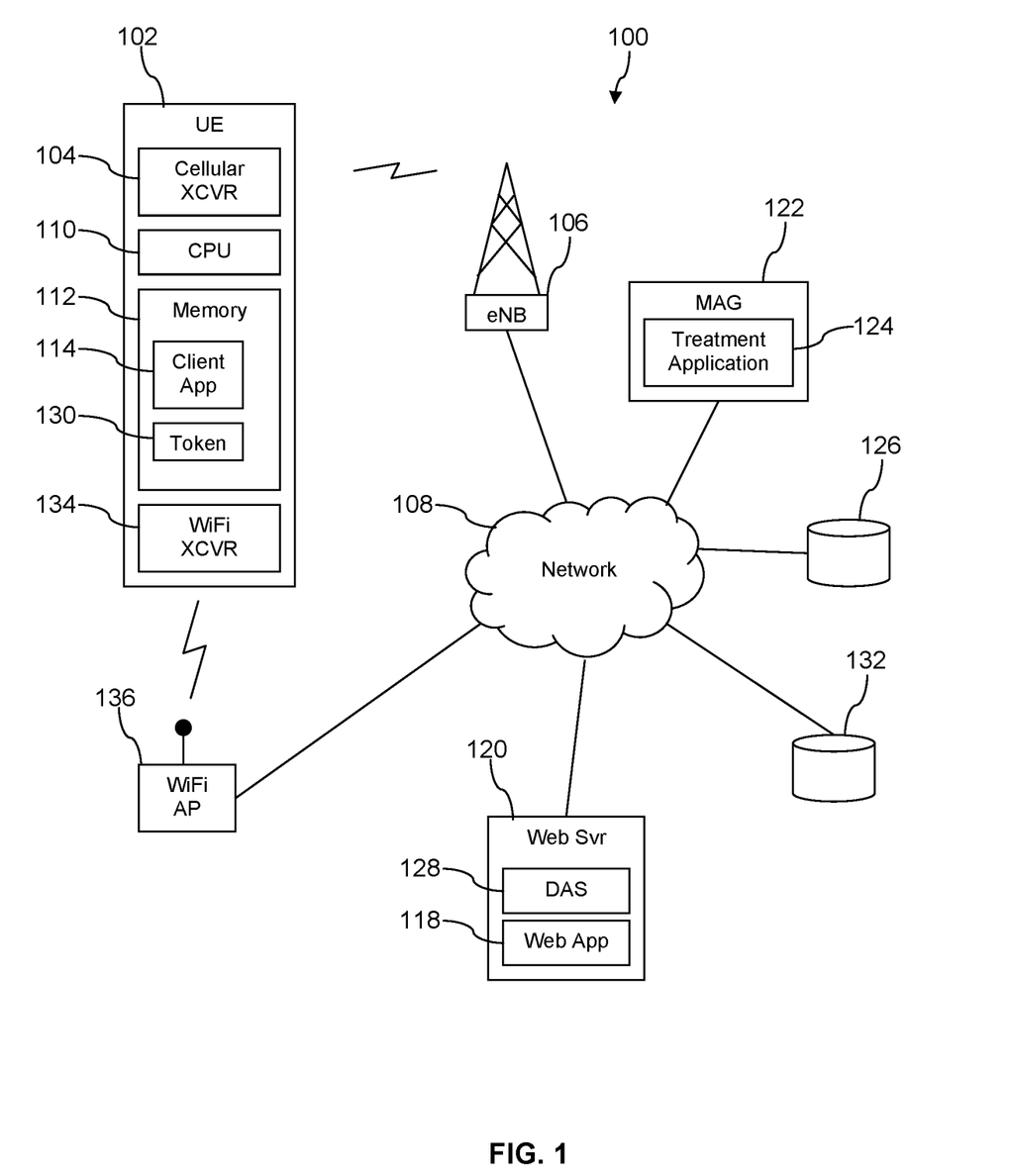
FIG. 1 is a block diagram of a communication system according to an embodiment of the disclosure.

Turning now to FIG. 1, a system 100 is described. In an embodiment, the system 100 comprises a mobile communication device (user equipment UE) 102 having a cellular radio transceiver 104 by which it is configured to establish a wireless communication link to a cell site 106 and therethrough establish communication coupling to a network 108. The UE 102 may be a mobile phone, a smart phone, a personal digital assistant (PDA), a media player, a wearable computer, a headset computer, a laptop computer, a notebook computer, or a tablet computer. The cellular radio transceiver 104 may establish a wireless link to the cell site 106 according to one or more of a long term evolution (LTE), a code division multiple access (CDMA), a global system for mobile communication (GSM), or a worldwide interoperability for microwave access (WiMAX) wireless communication protocol. The network 108 is one or more public communication networks, one or more private communication networks, or a combination thereof.

The UE 102 further comprises a processor 110 and a memory 112. The memory 112 may comprise a non-transitory portion and a transitory portion. In an embodiment, the non-transitory portion of the memory 112 stores a client application 114 that is configured to interact with a web application 118 executing on a web server 120, for example to request services be performed on behalf of a user of the UE 102 by the web application 118. The web application 118 may be a wireless communication service subscription account self-service application that promotes the user of the UE 102 managing his or her subscription account. The web application 118 may be a banking self-service application that promotes a user of the UE 102 managing his or her banking transactions and bank balances. While FIG. 1 illustrates a single client application 114 on the UE 102, it is understood that any number of client applications 114 may be co-located in the memory 112, and the system 100 may comprise any number of different web servers 120 hosting different web applications 118.

The client application 114 is configured to request a server application access token (sometimes referred to hereafter simply as a token for brevity) from a media access gateway (MAG) 122. The MAG 122 generally converts communication of different disparate types or interfaces to bridge from a first network using a first communication protocol to a second network using a second different communication protocol. In the present case, the MAG 122 bridges between cellular communication protocols and data communication protocols (e.g., Internet compatible protocols), whereby to connect the UE 102 to the network 108 to conduct data communication operations. The token request that the client application 114 sends to the MAG 122 comprises an IP address that was allocated to the UE 102 when it first authenticates into a radio access network (RAN) comprising the cell site 106. This same IP address is stored in an entry in a data store 126 that also contains other information about the mobile communication subscription account of the UE 102, for example a mobile directory number (MDN) of the UE 102. In some contexts, the data store 126 may be referred to as a provisioning data store. The IP address may be stored in a header of the token request. The request may specify itself to be a MAG proxy message. The MAG 122 may respond to the specification of the request as a MAG proxy message to execute a treatment application 124 that is configured to handle this specific token request from the client application 114.

The MAG 122 and/or the treatment application 124 executing on the MAG 122 parses the IP address of the UE 102 and uses that IP address to access the entry in the data store 126 that was created when the UE 102 authenticated into the RAN. If there is no entry associated with the IP address, the MAG 122 rejects the token request message at this point in the process. This may be considered a part of the security checking of the system 100. The MAG 122 learns the MDN of the UE 102 from this access and stores this in a token request message and sends this token request message to a device authentication server (DAS) application 128 that executes on the web server 120. The DAS 128 uses the MDN in the token request message to look up further information about the wireless communication subscription account and the UE 102. It is noted that by accessing the information in this particular fashion the system 100 avoids relying upon information provided directly by the UE 102, which is a security provision.

The DAS 128 determines if the subscription account associated with the MDN is in good standing. The DAS 128 determines if the UE 102 has been reported missing or stolen. The DAS 128 determines if there have been any recent transactions on the subscription account that are associated with an elevated risk of fraud. The DAS 128 determines if the UE 102 is provisioned for accessing the web application 118. If all of these checks are successful, the DAS 128 builds a web application access token for the client application 114.

In an embodiment, the token comprises the MDN of the UE 102, an equipment serial number (e.g., an international mobile equipment identity (IMEI)) of the UE 102, and a subscription identity of the UE 102 or the user of the UE 102. In an embodiment, the token comprises a time to live that limits the lifetime of the token. For example, the time to live may be defined to expire in a week, to expire in a month, or to expire in a quarter. In an embodiment, the token comprises a signature hash value that is created by hashing the information in the token based on a one-way secure hash function and based on a seed value known by the DAS 128. In an embodiment the token is a JSON web token (JWT).

The DAS 128 sends the web application access token to the MAG 122, and the MAG 122 returns the token to the client application 114. The client application 114 stores the token 130 in the non-transitory portion of the memory 112. Alternatively, the client application 114 stores the token 130 in a transitory portion of the memory 112, such that when the UE 102 is turned off, the token 130 is lost. When the UE 102 is turned back on, the client application 114 may determine that there is no token 130 stored in the memory 112 and repeat the process described above of obtaining the token 130.

When a user of the UE 102 requests a service from the web application 118 via the client application 114 (e.g., using a user interface presented on the UE 102), the client application 114 builds a service request message, encapsulates the token 130 in the service request message, and transmits the service request message to the web server 120. In an embodiment, the UE 102 further comprises a WiFi radio transceiver 134 that is configured to establish a wireless communication link with a WiFi access point (AP) 136 and therethrough communicatively couple to the network 108. The client application 114 is free to send the service request message comprising the token 130 via the cellular radio transceiver 104 to the cell site 106 to the network 108 and then to the web server 120 or to send the service request message comprising the token 130 via the WiFi radio transceiver 134 to the WiFi AP 136 to the network 108 and then to the web server 120. In either case, it can be said that the authentication of the client application 114 and the UE 102 by the web server 120 leverages the inherent security of the RAN, because the token 130 is secure and depends on the secure authentication of the UE 102 into the RAN.

The DAS 128 evaluates the token 130 received in the service request message from the client application 114. The DAS 128 verifies that the MDN and equipment serial identifier in the token 130 match what are current for the subscription account identified in the token 130, for example by accessing the data store 126. If the MDN and equipment serial identifier in the token 130 do not match what is current in the subscription account (e.g., the user has purchased a new mobile phone), the service request message is rejected and the client application 114 is instructed to obtain a new token 130. The DAS 128 verifies that there are no holds or flags set on the account. The DAS 128 verifies that the token 130 presented is associated with the requested service (e.g., the token 130 is associated with the confidential data being accessed, such as matches a specific wireless communication subscription account whose self-service application is being accessed). If the token 130 is validated and there is no other reason to thwart the request, the DAS 128 forwards the service request message to the web application 118 for processing.

The DAS 128 may calculate a hash value over the information contents of the token using a seed known to the DAS 128 and compare this calculated hash value to a stored hash value provided in the token. If the values do not match, the token has likely been altered after original creation, and the DAS 128 may reject the token and reject the service request message. In an embodiment, when the DAS 128 creates tokens it stores a copy in a token data store 132. When validating a token, the DAS 128 may look up the corresponding stored token in the token data store 132. If no such matching stored token is found, the DAS 128 may reject the service request message. In an embodiment, other actions related to the wireless communication service subscription account may result in a stored token being deleted from the token data store 132.

In an embodiment, when the DAS 128 rejects a service request message it keeps some record of the rejection, for example retaining a copy of the service request message itself, the reasons for rejection, a date and time of the service request message. The DAS 128 may take note of a source IP associated with the rejected service message. The DAS 128 may take note of any other available communication routing information associated with the rejected service message. The DAS 128 may store the information about the rejected service request message in the token data store 132. When service request messages are rejected, the DAS 128 may further search the token data store 132 to determine if a series of service request messages have been rejected from a common source within a short period of time. The DAS 128 may analyze the details of the rejected service request message in the context of the stored information on other previous rejected service request messages to determine if a systematic cyber attack is being targeted to the web application 118.

In an embodiment, if the DAS 128 determines that such a systematic cyber attack is underway, it may take action to thwart the cyber attack, for example interworking with a wireless communication service provider firewall to add an IP address associated with the hacker to a black list of blocked IPs. If the DAS 128 determines that a systematic cyber attack is being launched from the UE 102, the DAS 128 may add the IP address associated with the UE 102 to a black list of a service provider firewall and may de-provision the UE 102 from the cellular network. Alternatively, the DAS 128 may send a message, such as an email with high importance, to a human operator (e.g., a network security technician or information technology technician) containing information about the attack, whereby the human operator can manually take action to thwart the cyber attack. In an embodiment, the DAS 128 and/or the notified human operator may share details of the cyber attack with other enterprises and/or cyber security agencies whereby other enterprises and security organizations can take appropriate actions to protect themselves from the cyber attack and to prosecute the cyber attacker if possible.

The web application 118 processes the service request accordingly. In some circumstances, the web application 118 may perform the requested service with no further verification. In other circumstances, for example, based on the requested service, the web application 118 may request the client application 114 obtain a user identity and a password from the user of the UE 102 and return the user identity and password to the web application 118 to be able to invoke the requested service. Note that the above process would prevent a robot identity theft application from merely trying combination after combination of userid-password combinations, for example userid-password combinations hacked from a different application. In the case of a robot hacking application, the request would have never been routed to the web application 118.

Figure 2:
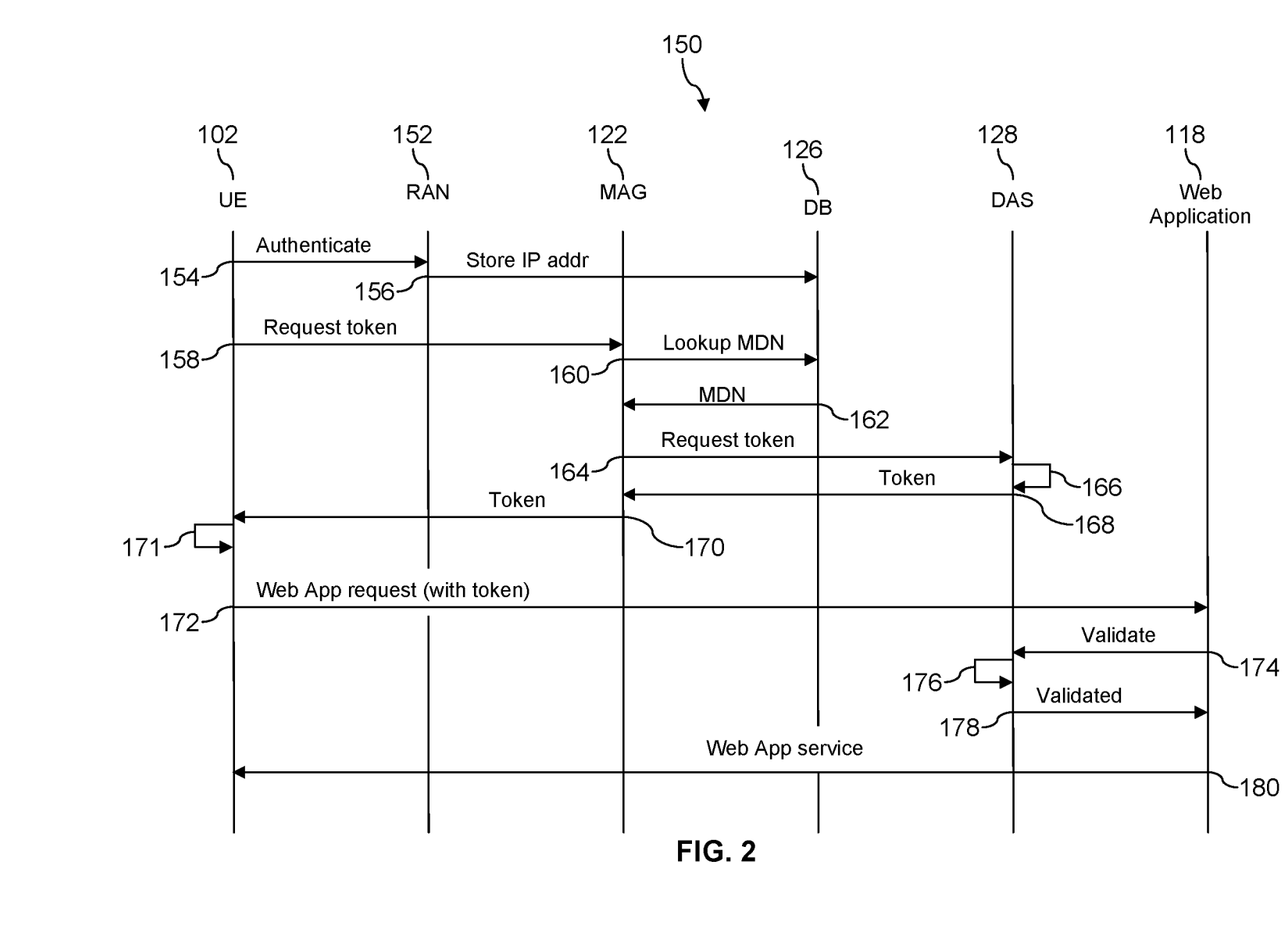
FIG. 2 is a message sequence diagram according to an embodiment of the disclosure.

Turning now to FIG. 2, a message sequence 150 is described. The UE 102 sends an authenticate message to a radio access network (RAN) 152. The RAN 152 can comprise a large number of cell sites 106 as well as other nodes that provide support for the RAN 152. When a UE 102 attempts to attach to the RAN 152, the RAN receives the wireless credentials provided by the UE 102 and validates these credentials in the wireless communication service provider's network. This process of UE 102 authentication for attachment to the RAN 152 is considered to be secure. For example, the credentials provided by the UE 102 may comprise private information that is not susceptible of being hacked or copied, for example using encryption techniques. When the UE 102 authenticates into the RAN 152 and attaches to the RAN 152, an IP address is allocated by the RAN 152 for the UE 102, is announced to the UE 102, and a message 156 is sent to store the IP address linked to or associated with other wireless communication subscription account information of the UE 102, for example the MDN of the UE 102, in the data store 126.

At some later time, the UE 102 may execute the client application 114. This may happen because a user of the UE 102 invokes the client application 114 on the UE 102, for example to buy a new phone through a wireless service provider self-service web application or to transfer money from a bank savings account to a bank debit card account. The client application 114 is configured to determine if a token 130 is stored in the memory 112, and if no token 130 is stored to request the token 130 from the MAG 122. The UE 102 sends a message 158 to request the token 130 to the MAG 122. In an embodiment, the message 158 may designate the request to be a MAG proxy type of request. The MAG 122 parses the message 158 to determine an IP address of the UE 102. The MAG 122 then sends a message 160 to the data store 126 with the IP address to look up the data entry created associating the IP address to the MDN and subscriber account when the UE 102 authenticated into the RAN 152.

If the IP address is found in the data store 126, the data store 126 sends a message 162 with the MDN to the MAG 122. If the IP address is not found, the data store 126 sends a message indicating the requested information could not be found. At this point the MAG 122 would send a failure message back to the UE 102, possibly with further information characterizing the failure and/or recommending corrective action (e.g., reboot the UE 102 to detach from and reattach to the RAN 152. In an embodiment, this provides a measure of security in that only by first authenticating into the RAN 152 can the token request process move forwards, thereby leveraging the high level of security provided by authentication into the RAN 152 into the client application 114 access to the web application 118.

The MAG 122 sends a token request message 164 comprising the MDN to the DAS 128. The DAS 128 validates the token request message 164 based on the MDN as described above. The DAS 128 builds 166 the token 130 as described above, and sends a token message 168 containing the token to the MAG 122. The MAG 122 sends a token message 170 containing the token to the UE 102. The UE 102 stores 171 the token 130 in the memory 112.

At some later point, the UE 102 sends a web application service request message 172 comprising the token 130 to the web application 118. The web application 118 sends a validate request message 174 comprising the token 130 to the DAS 128. The DAS 128 validates 176 the token 130 and returns a validated message 178 to the web application 118. The web application 118 then performs the requested service and returns a message 180 to the UE 102. While the time to live of the token remains valid, the sequence of messages 172, 174, 176, 178, 180 may take place a plurality of times. By using a web application access token, the task of verifying the client application 114 can be streamlined and made more efficient, both to the advantage of the web server 120 and for the user of the UE 102. Further, the web application access token provides a much increased level of security by leveraging the security inherent in authenticating into the RAN 152.

Figure 3A:
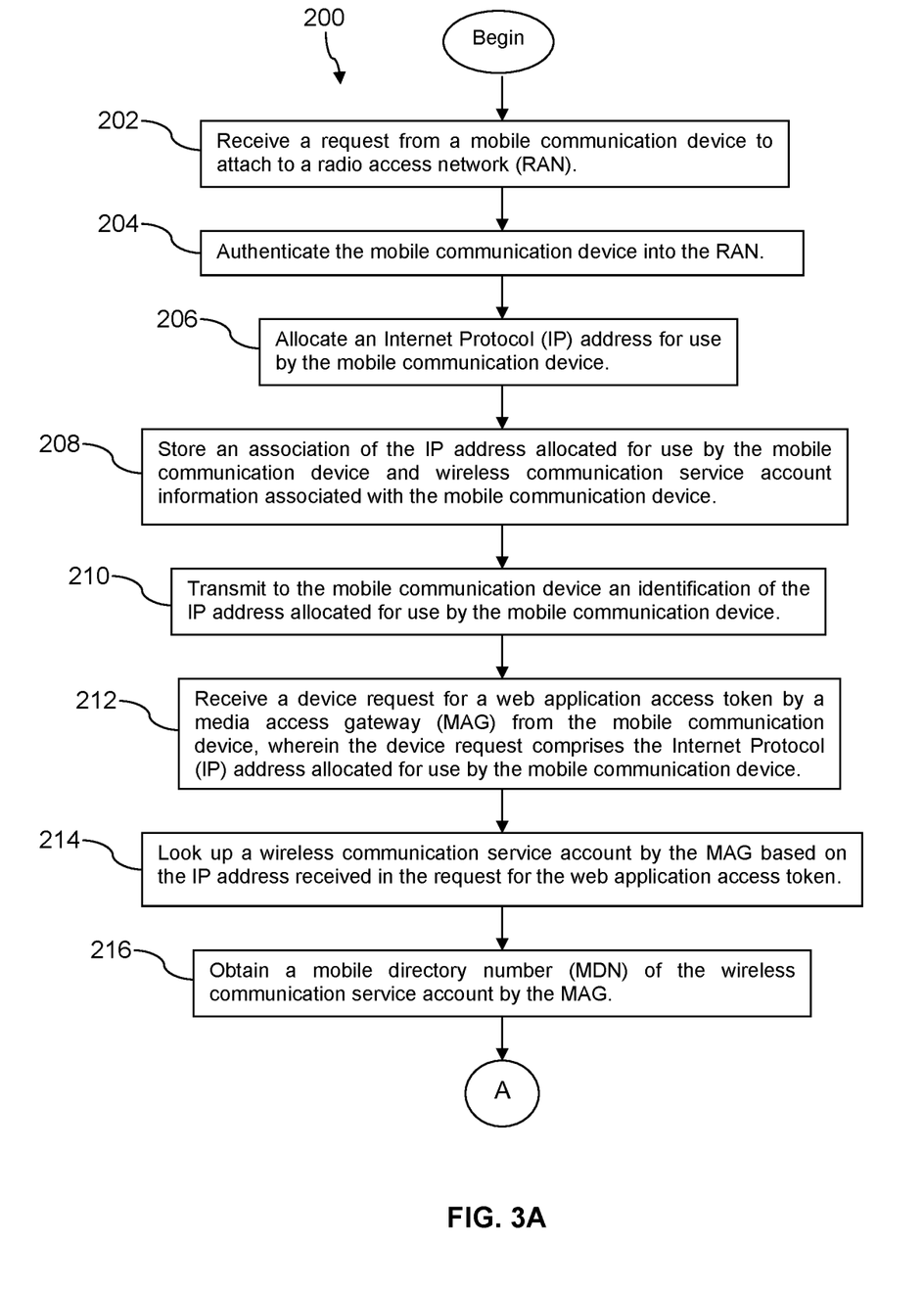
FIG. 3A and FIG. 3B is a flow chart of a method according to an embodiment of the disclosure.
Figure 3B:
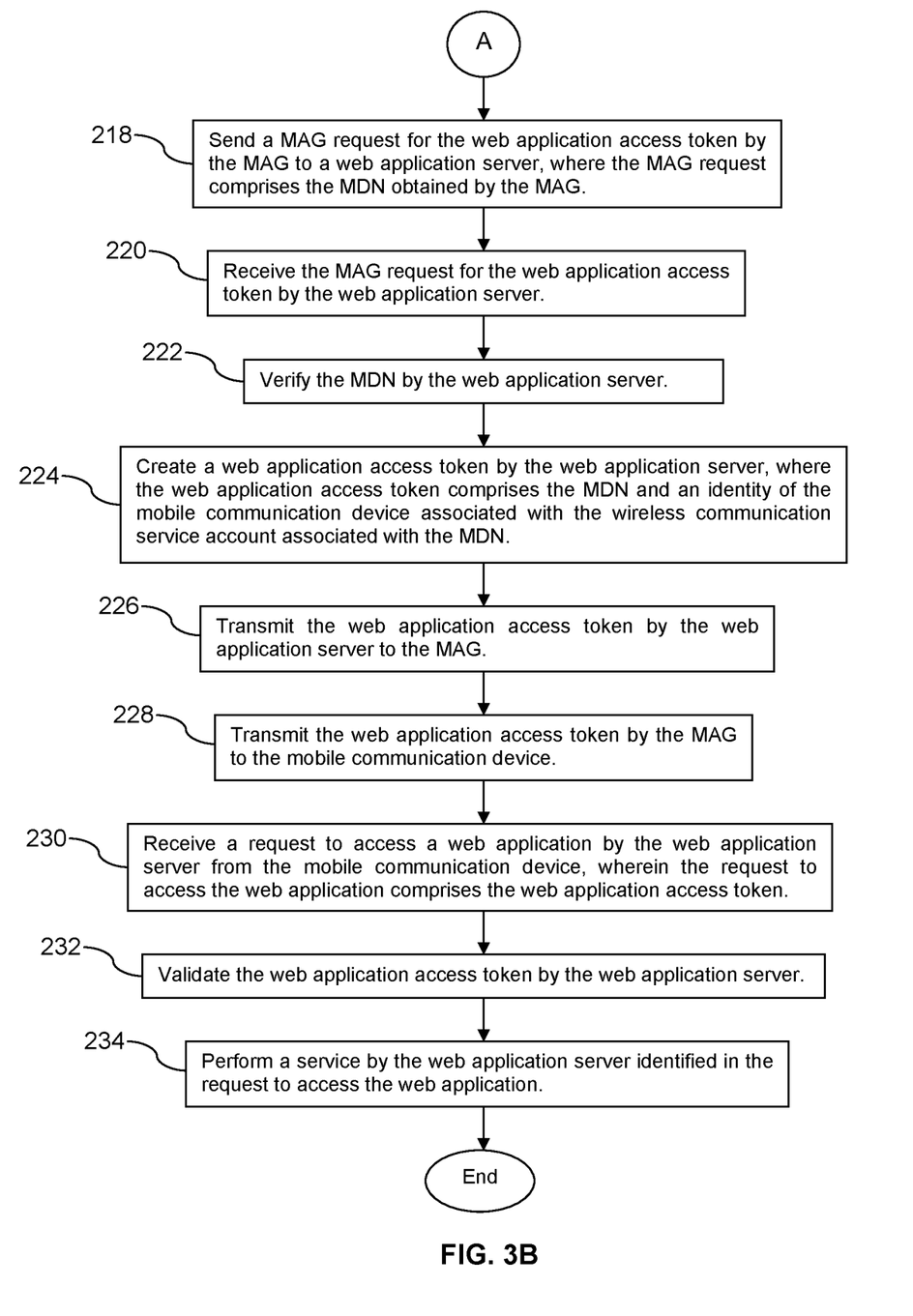

Turning now to FIG. 3A and FIG. 3B, a method 200 is described. At block 202, receive a request from a mobile communication device to attach to a radio access network (RAN). At block 204, authenticate the mobile communication device into the RAN. At block 206, allocate an Internet Protocol (IP) address for use by the mobile communication device. At block 208, store an association of the IP address allocated for use by the mobile communication device and wireless communication service account information associated with the mobile communication device. At block 210, transmit to the mobile communication device an identification of the IP address allocated for use by the mobile communication device.

At block 212, receive a device request for a web application access token by a media access gateway (MAG) from the mobile communication device, wherein the device request comprises the Internet Protocol (IP) address allocated for use by the mobile communication device. At block 214, lookup a wireless communication service account by the MAG based on the IP address received in the request for the web application access token. At block 216, obtain a mobile directory number (MDN) of the wireless communication service account by the MAG. At block 218, send a MAG request for the web application access token by the MAG to a web application server, where the MAG request comprises the MDN obtained by the MAG.

At block 220, receive the MAG request for the web application access token by the web application server. At block 222, verify the MDN by the web application server. At block 224, create a web application access token by the web application server, where the web application access token comprises the MDN and an identity of the mobile communication device associated with the wireless communication service account associated with the MDN. At block 226, transmit the web application access token by the web application server to the MAG.

At block 228, transmit the web application access token by the MAG to the mobile communication device. At block 230, receive a request to access a web application by the web application server from the mobile communication device, wherein the request to access the web application comprises the web application access token. In an embodiment, the request to access the web application may further identity a web application account. At block 232, validate the web application access token by the web application server. The processing of block 232 may comprise determining that the MDN in the token is associated with the web application account identified in the request to access the web application and that the subscriber associated with the MDN is provisioned to use the web application account (e.g., the subscriber may be temporarily denied access to the web application account). Other validation of the web application access token may comprise determining a hash over the contents of the token and comparing the calculated hash value to a hash value store din the token. At block 234, perform a service by the web application server identified in the request to access the web application.

Figure 4:
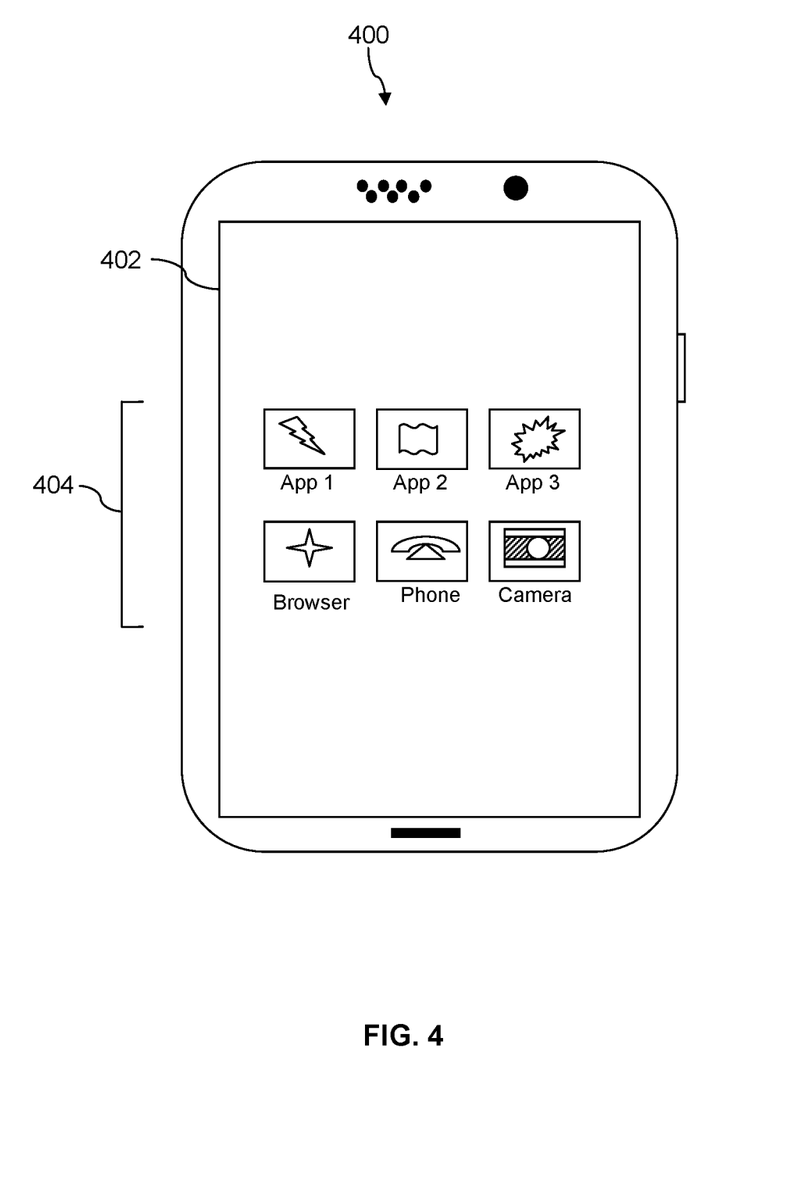
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
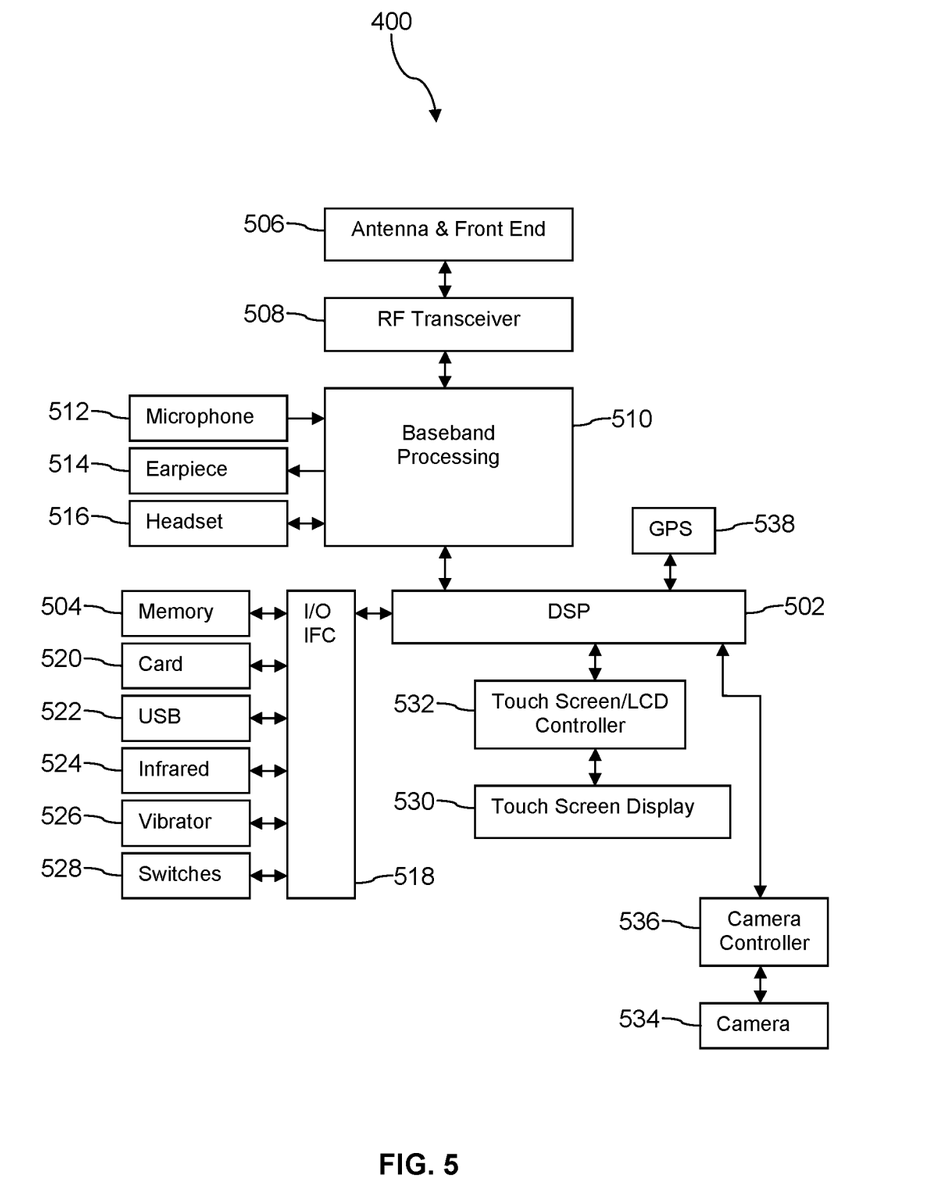
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
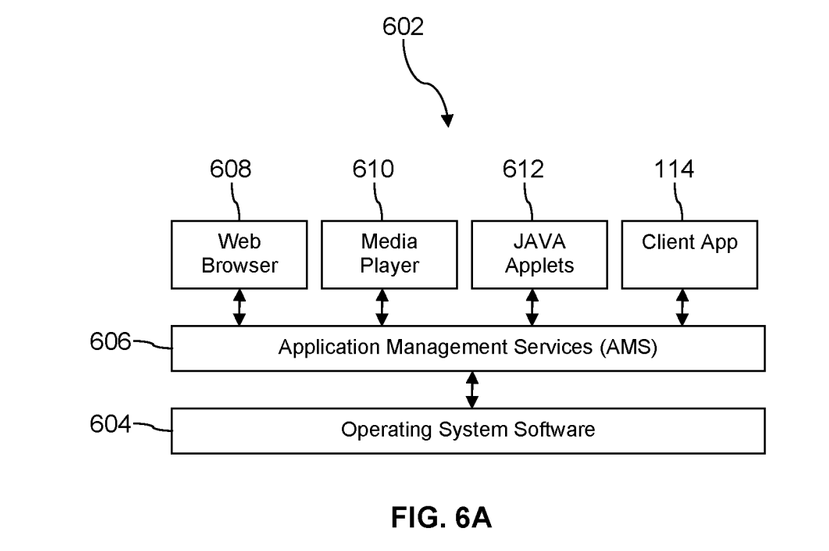
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, JAVA applets 612, and the client application 114. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality. The client application 114 may execute on top of the AMS 606.

Figure 6B:
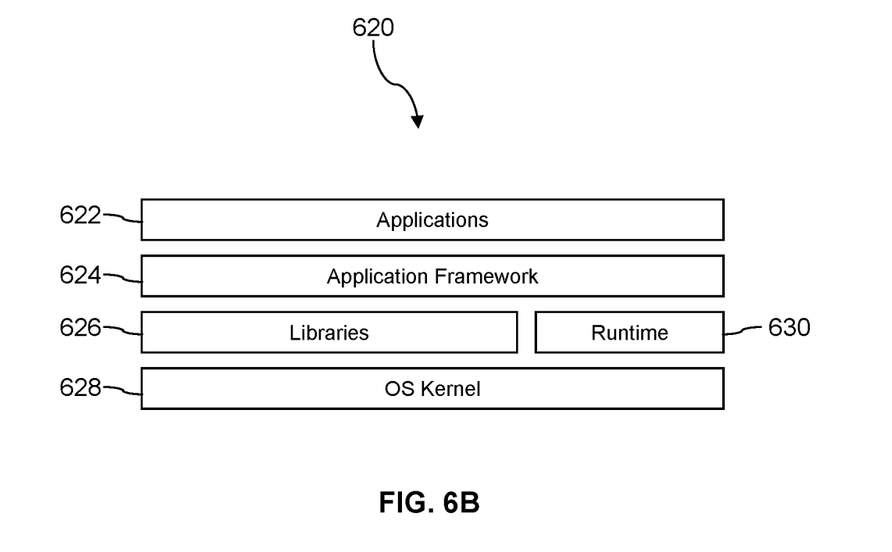
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
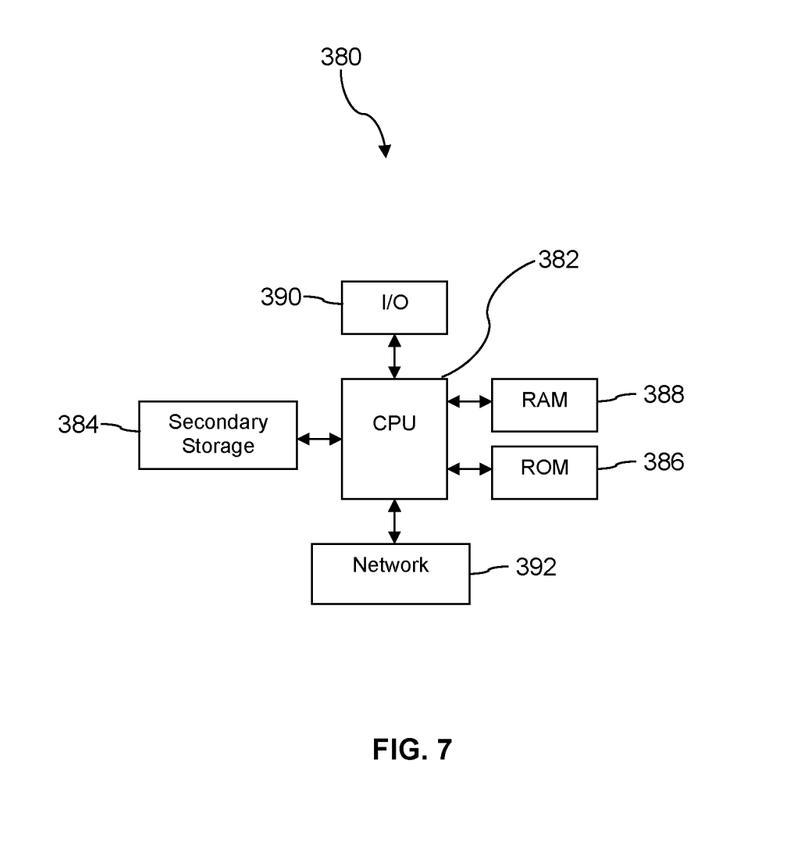
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating a request from a client application on a mobile communication device to access a web application using independent verification of a wireless subscription service account, comprising:
   receiving a request from a mobile communication device to attach to a radio access network (RAN);
   authenticating the mobile communication device into the RAN;
   allocating an Internet Protocol (IP) address for use by the mobile communication device;
   storing an association of the IP address allocated for use by the mobile communication device and wireless communication service account information associated with the mobile communication device;
   transmitting to the mobile communication device an identification of the IP address allocated for use by the mobile communication device;
   receiving a device request for a web application access token by a media access gateway (MAG) from the mobile communication device, wherein the device request comprises the Internet Protocol (IP) address allocated for use by the mobile communication device;
   looking up a wireless communication service account by the MAG based on the IP address received in the request for the web application access token;
   obtaining a mobile directory number (MDN) of the wireless communication service account by the MAG;
   sending a MAG request for the web application access token by the MAG to a web application server, where the MAG request comprises the MDN obtained by the MAG;
   receiving the MAG request for the web application access token by the web application server;
   verifying the MDN by the web application server;
   creating a web application access token by the web application server, where the web application access token comprises the MDN and an identity of the mobile communication device associated with the wireless communication service account associated with the MDN;
   transmitting the web application access token by the web application server to the MAG;
   transmitting the web application access token by the MAG to the mobile communication device;
   receiving a request to access a web application by the web application server from the mobile communication device, wherein the request to access the web application comprises the web application access token;
   validating the web application access token by the web application server; and
   performing a service by the web application server identified in the request to access the web application.

2. The method of claim 1, wherein the request to access the web application is received from a WiFi access point.

3. The method of claim 1, wherein the request to access the web application is received from a cell site.

4. The method of claim 1, wherein the web application is a wireless communication service subscription self-service web application.

5. The method of claim 1, wherein the web application is an electronic banking application.

6. The method of claim 1, further comprising receiving a second request to access the web application by the web application server, wherein the second request does not comprise the web application access token and sending a request rejection message by the web application server based on the second request not containing the web application access token.

7. The method of claim 1, wherein the web application server executes a device authentication server application and a web application, wherein the device authentication server application receives the request to access a web application from the mobile communication device and validates the web application token and the web application performs the service identified in the request to access the web application.

8. A mobile communication device, comprising:
   a processor;
   a non-transitory memory;
   a cellular radio transceiver; and
   a client application stored in the non-transitory memory that, when executed by the processor:
      checks the non-transitory memory for a web application access token corresponding to the client application,
      determines that the non-transitory memory does not store the web application access token,
      transmits a web application access token request via the cellular radio transceiver to a Media Access Gateway (MAG), where the web application access token request comprises an identification of an Internet Protocol (IP) address allocated to the mobile communication device when authenticating into a radio access network (RAN) by the cellular radio transceiver, and wherein the MAG looks up a wireless communication service account based on the IP address, obtains a mobile directory number (MDN) of the wireless communication service account, and sends a MAG request that includes the MDN to a web application server requesting a web application access token,
      receives the web application access token created by the web application server from the MAG, wherein the web application access token comprises the MDN,
      stores the web application access token in the non-transitory memory, and
      sends a request to access a web application comprising the web application access token to a web application server, where the web application server is different from the MAG.

9. The mobile communication device of claim 8, wherein the mobile communication device is a mobile phone, a smart phone, a personal digital assistant (PDA), a media player, a wearable computer, a headset computer, a laptop computer, a notebook computer, or a tablet computer.

10. The mobile communication device of claim 8, wherein the cellular radio transceiver is configured to attach to a radio access network (RAN) according to a long term evolution (LTE), a code division multiple access (CDMA), a global system for mobile communication (GSM), or a worldwide interoperability for microwave access (WiMAX) wireless communication protocol.

11. The mobile communication device of claim 8, wherein the web application access token comprises a mobile directory number (MDN), an international mobile equipment identity (IMEI) and a subscriber identity associated with the mobile communication device.

12. The mobile communication device of claim 11, wherein the web application access token comprises a time to live value.

13. The mobile communication device of claim 12, wherein the web application access token comprises a hash value.

14. The mobile communication device of claim 8, wherein the client application is a wireless communication service account self-service client application.

15. The mobile communication device of claim 8, wherein the client application is a banking client application.

16. A method of authenticating a request from a client application on a mobile communication device to access a web application using independent verification of a wireless subscription service account, comprising:

receiving a device request for a web application access token by a media access gateway (MAG) from a mobile communication device, wherein the device request comprises an Internet Protocol (IP) address allocated for use by the mobile communication device;

looking up a wireless communication service account in a provisioning data store by the MAG based on the IP address received in the request for the web application access token;

obtaining a mobile directory number (MDN) of the wireless communication service account by the MAG;

sending a MAG request for the web application access token by the MAG to a web application server, where the MAG request comprises the MDN obtained by the MAG;

receiving the MAG request for the web application access token by the web application server, where the web application server executes a web application;

verifying by the web application server that the wireless communication service account associated with the MDN in the MAG request is in good standing and that the mobile communication device is provisioned for access to the web application;

creating a web application access token by the web application server, where the web application access token comprises the MDN, an identity of the mobile communication device associated with the wireless communication service account associated with the MDN, and a time-to-live;

transmitting the web application access token by the web application server to the MAG;

transmitting the web application access token by the MAG to the mobile communication device;

receiving a request to access the web application by the web application server from the mobile communication device, wherein the request to access the web application comprises the web application access token and identifies a web application account;

validating the web application access token by the web application server by assuring the MDN is associated with the web application account identified in the request to access the web application and that the time-to-live in the web application access token is not expired; and performing a service by the web application server identified in the request to access the web application.

17. The method of claim 16, wherein verifying that the wireless communication service account associated with the MDN in the MAG request is in good standing comprises checking for a report of a lost or stolen device.

18. The method of claim 16, wherein validating the web application access token by the web application server comprises assuring that the MDN and an international mobile equipment identity (IMEI) of the token match the MDN and IMEI defined for the subscription account in the provisioning data store.

19. The method of claim 18, wherein validating the web application access token by the web application server comprises calculating a hash value over at least a portion of the token using a seed known to the web application server and comparing this calculated hash value to a hash value stored in the token.

20. The method of claim 16, wherein the mobile communication device is a mobile phone, a smart phone, a personal digital assistant (PDA), a media player, a wearable computer, a headset computer, a laptop computer, a notebook computer, or a tablet computer.

* * * * *